United States Patent
Su et al.

(10) Patent No.: US 8,222,364 B2
(45) Date of Patent: Jul. 17, 2012

(54) COMPOSITION INCLUDING A SILOXANE AND A METHOD OF FORMING THE SAME

(75) Inventors: Kai Su, Midland, MI (US); Duane R. Bujalski, Auburn, MI (US); Peter Y. Lo, Midland, MI (US); Eric Kolb, Acton, MA (US)

(73) Assignees: Dow Corning Corporation, Midland, MI (US); DCE Aprilis, Inc., Maynard, MI (US)

( * ) Notice: Subject to any disclaimer, the term of this patent is extended or adjusted under 35 U.S.C. 154(b) by 621 days.

(21) Appl. No.: 12/296,815

(22) PCT Filed: Apr. 10, 2007

(86) PCT No.: PCT/US2007/008793
§ 371 (c)(1),
(2), (4) Date: Sep. 4, 2009

(87) PCT Pub. No.: WO2007/120628
PCT Pub. Date: Oct. 25, 2007

(65) Prior Publication Data
US 2010/0105844 A1    Apr. 29, 2010

Related U.S. Application Data

(60) Provisional application No. 60/744,637, filed on Apr. 11, 2006, provisional application No. 60/896,190, filed on Mar. 21, 2007.

(51) Int. Cl.
*C08G 77/04* (2006.01)
*C08G 77/12* (2006.01)

(52) U.S. Cl. ............... 528/40; 528/10; 528/15; 528/31

(58) Field of Classification Search .................. None
See application file for complete search history.

(56) References Cited

U.S. PATENT DOCUMENTS

| | | | |
|---|---|---|---|
| 3,419,593 A | 12/1968 | Willing | |
| 3,899,328 A * | 8/1975 | Limburg | 430/70 |
| 4,381,260 A * | 4/1983 | Chu et al. | 534/726 |
| 4,766,176 A | 8/1988 | Lee et al. | |
| 5,017,654 A | 5/1991 | Togashi et al. | |
| 5,414,069 A | 5/1995 | Cumming et al. | |
| 6,027,537 A * | 2/2000 | Leduc et al. | 8/405 |
| 6,365,765 B1 * | 4/2002 | Baldwin et al. | 556/440 |
| 6,423,378 B1 * | 7/2002 | Cotting et al. | 427/387 |
| 6,489,065 B1 * | 12/2002 | Dhal et al. | 430/2 |
| 6,784,300 B2 | 8/2004 | Cetin et al. | |
| 6,922,385 B2 | 7/2005 | Edwards | |
| 7,976,585 B2 * | 7/2011 | Cremer et al. | 8/405 |
| 2002/0025991 A1 * | 2/2002 | Crivello | 522/25 |
| 2002/0068223 A1 | 6/2002 | Cetin et al. | |
| 2002/0137870 A1 | 9/2002 | Crivello | |
| 2004/0236057 A1 | 11/2004 | Chevalier et al. | |
| 2004/0249181 A1 | 12/2004 | Cetin et al. | |
| 2005/0059543 A1 | 3/2005 | Kolb et al. | |
| 2005/0134948 A1 | 6/2005 | Waldman et al. | |
| 2007/0092804 A1 * | 4/2007 | Kolb et al. | 430/2 |

FOREIGN PATENT DOCUMENTS

EP        1101786 A1        5/2001
WO    WO 2007120628 A2 *    10/2007

OTHER PUBLICATIONS

Gupta et al. "Ruthenium-Catalyzed Chemical Modification of Poly(vinylmethylsiloxane) with 9-Acetylphenanthrene", Macromolecules, 2002, 35, 3369-3373.*
PCT International Search Report for PCT/US2007/008793 dated Oct. 5, 2007, 3 pages.
Article: Psaltis et al, "Holographic Data Storage", Computer/IEEE, 1998, pp. 52-60.
Article: Tullo, "Data Storage in 3-D", Chemical & Engineering News, Jun. 27, 2005, vol. 83, No. 26, pp. 31-32.
Article: Schnoes, "Holographic Data Storage Media for Practical Systems", In Phase Technologies, Jun. 4, 2003, 9 pages.

* cited by examiner

*Primary Examiner* — Robert S Loewe
(74) *Attorney, Agent, or Firm* — Howard & Howard Attorneys PLLC

(57) ABSTRACT

A composition includes a siloxane of the formula:

$(RMe_2SiO_{1/2})_a(MeRSiO_{2/2})_b(RSiO_{3/2})_c(SiO_{4/2})_d$ wherein a is at least 2, b is from 3 to 20, c is from 0 to 10, d is from 0 to 10, and each R is independently of the formula —CR'$_2$—CR'$_2$—Y—Z or CR'$_2$—CR'$_2$—Z, wherein each R' is independently a hydrogen atom or a $C_1$ to $C_{10}$ hydrocarbyl free of aliphatic unsaturation so long as at least one R' is a hydrogen atom, Y is a divalent organic group, and Z is a polycyclic group containing at least one aromatic ring. A method of making the siloxane includes charging $(HMe_2SiO_{1/2})_a(MeHSiO_{2/2})_b(HSiO_{3/2})_c(SiO_{4/2})_d$, a platinum catalyst, and an alkene of the formula CR'$_2$=CR'—Y—Z or CR'$_2$=CR'—Z into a reactor to form the siloxane. The siloxane is useful as a component in holographic storage media for photopolymer-based holographic data storage applications. The siloxane exhibits excellent compatibility when mixed with a polymerizable component before the polymerizable component is cured. Furthermore, the siloxane exhibits excellent diffusion from polymers of the polymerizable component after partial and complete curing. The siloxane also has a high refractive index while maintaining the excellent compatibility and diffusion properties when mixed with polymerizable component.

22 Claims, No Drawings

COMPOSITION INCLUDING A SILOXANE AND A METHOD OF FORMING THE SAME

CROSS REFERENCE TO RELATED APPLICATIONS

This application claims priority to and the benefit of International Patent Application No. PCT/US2007/008793. filed Apr. 10, 2007 which claims priority to U.S. Provisional Patent Application Ser. Nos. 60/744,637 filed on Apr. 11, 2006 and 60/896,190, filed on Mar. 21, 2007, respectively.

FIELD OF THE INVENTION

The present invention generally relates to a composition including a siloxane. More specifically, the invention relates to a composition including a siloxane that is useful as a component in holographic storage media for photopolymer-based holographic data storage applications.

BACKGROUND OF THE INVENTION

Many different types of data storage media have been developed to store information. Traditional media, for instance, include magnetic media, optical media, and mechanical media. Increasing data storage density is a paramount goal in the development of new or improved types of data storage media.

Holographic data storage is an emerging technology, that provides many advantages over traditional forms of data storage. One advantage of holographic data storage is that it enables volumetric storage of digital data in holographic storage media. The volumetric storage is accomplished by making use of a full thickness of the holographic storage media, thereby providing data densities proportional to thickness of the holographic storage media. More specifically, the recording of a digital bit is distributed throughout a recording volume of the holographic storage media, rather than as a localized region of magnetization or optical change. Moreover, each image may contain many bits, and many images can be uniquely recorded into the storage media and extracted from a finite volume of the storage media. This makes possible capacities of more than 1,000 GB on a CD disk format. By comparison, DVD technology provides only 9 GB on a single-sided disk.

Another advantage of holographic data storage is that it represents an opportunity to significantly increase data transfer rates well beyond those that may be achieved with conventional DVD technology. More specifically, in holographic data storage, data is transferred as pages of optical information from a single head. This contrasts with conventional DVD technology, which transfers data in a serial stream of bits. Consequently, holographic data storage provides a substantially faster data transfer rate from the single head, surpassing 100 MB/sec. By comparison, conventional DVD technology provides a data transfer rate of only 5 MB/sec.

In holographic data storage, data is stored within the holographic storage medium as an interference pattern resulting from the interference of object and reference beams. More specifically, the object beam is encoded with the data using a spatial light modulator that selectively blocks the beam or allows the beam to pass through, thereby creating a pattern of light and dark regions. The object beam including the pattern is then projected onto a spinning disk including the holographic storage medium. A reference beam that is coherent with the object beam is also projected onto the spinning disk. The reference beam interferes with the object beam, thereby forming the pattern of the object beam in the holographic storage medium.

Photopolymer-based holographic data storage applications are one example of holographic data storage applications. In the photopolymer-based holographic data storage applications, the holographic storage media includes a binder which is generally a non-polymerizable component, a polymerizable monomer, and a photoacid generator. As a result of the interference created by the reference and object beams, the photoacid generator initiates curing or polymerization of the polymerizable monomer in the light regions of the pattern. The binder typically exhibits compatibility with the polymerizable monomer prior to curing of the polymerizable monomer, yet diffuses from the polymer of the polymerizable monomer after curing. As a result, the polymer of the polymerizable monomer localizes in the light regions of the pattern, and the binder localizes in dark regions of the pattern.

The binder has a different refractive index from the polymer of the polymerizable monomer. As a result, the regions including the polymer of the polymerizable monomer exhibit a different refractive index than the regions including the binder. The difference in refractive index between the regions provides a refractive index modulation that is needed to form a hologram of the pattern in the holographic storage medium, with larger differences between the respective refractive indexes resulting in greater storage capacity of the holographic storage media. As such, it is important that a refractive index of the binder be as high as possible.

Recently, it has been found that certain epoxy monomers, when used as the polymerizable monomer, minimize problems with shrinkage that exist when other polymerizable monomers are included in the holographic storage media. Specifically, the epoxies exhibit minimal shrinkage after polymerization, which is desirable for holographic data storage applications.

To obtain holographic storage media with maximum storage capacity and image fidelity, it is important to minimize light scattering before curing, after partial cure, and after complete cure of the polymerizable monomer. To minimize the light scattering, it is important that the binder is compatible with the polymerizable monomer before curing, but diffuses during curing of the epoxy monomers to result in domains rich in the epoxy monomer or polymer thereof, and other domains rich in the binder. More specifically, during polymerization, the polymerizable monomer diffuses to monomer rich domains and reacts to form polymers. After reaction, the domains are rich in polymer. The diffusion of the monomer toward the domains rich in the polymer results in diffusion of the binder away from the domains rich in the polymer, thereby resulting in the domains rich in the polymer and the domains rich in the binder. The diffusion results in the necessary index modulation as described above.

In the holographic storage media including the epoxy monomers, binders that have found particular use include, in particular, poly(methyl phenyl siloxanes) and oligomers thereof, such as 1,3,5-trimethyl-1,1,3,5,5-pentaphenyltrisiloxane. Further, other binders that have found particular use include polysiloxane chains having electroluminescent side groups, which comprise a plurality of aromatic rings, as disclosed in U.S. Pat. No. 5,414,069 to Cumming et al. (hereinafter the '069 patent). The polysiloxanes of the '069 patent may exhibit high refractive indexes. Although the poly(methyl phenyl siloxanes) are compatible with the epoxy monomers and diffuse during curing of the epoxy monomers to result in the domains rich in the epoxy monomer or polymer thereof, and other domains rich in the binder, and although the polysiloxane chains of the '069 patent may exhibit high refractive indexes, there remains an opportunity to provide a siloxane that exhibits the same compatibility and diffusion properties as the poly(methyl phenyl siloxanes) but that has a higher refractive index, even higher than the polysiloxanes of the '069 patent, to minimize light scattering and maximize data storage capacity of the holographic storage media.

SUMMARY OF THE INVENTION AND ADVANTAGES

The subject invention provides a composition including a siloxane of the formula:

$$(RMe_2SiO_{1/2})_a(MeRSiO_{2/2})_b(RSiO_{3/2})_c(SiO_{4/2})_d$$

wherein a is at least 2, b is from 3 to 20, c is from 0 to 10, d is from 0 to 10, and each R is independently of the formula —CR'$_2$—CR'$_2$—Y—Z or CR'$_2$—CR'$_2$—Z, wherein each R' is independently a hydrogen atom or a $C_1$ to $C_{10}$ hydrocarbyl free of aliphatic unsaturation so long as at least one R' is a hydrogen atom, Y is a divalent organic group, and Z is a polycyclic group containing at least one aromatic ring. For the method, $(HMe_2SiO_{1/2})_a(MeHSiO_{2/2})_b(HSiO_{3/2})_c(SiO_{4/2})_d$, a hydrosilylation catalyst, and an alkene of the formula CR'$_2$=CR'—Y—Z or CR'$_2$=CR'—Z are each charged into a reactor to form the siloxane.

The siloxane may be useful as a component in holographic storage media for photopolymer-based holographic data storage applications. The siloxane exhibits excellent compatibility, i.e., miscibility, when mixed with a polymerizable component, especially epoxy monomers or oligomers, before the polymerizable component is cured. Furthermore, the siloxane exhibits excellent diffusion during curing of the polymerizable component to result in domains rich in the polymerizable component or polymer thereof, and other domains rich in the siloxane due to b being from 3 to 20.

As indicated above, the siloxane of the present invention is miscible with the polymerizable component. This miscibility results in a clear solution of the siloxane and the polymerizable component before cure, and there is transparency after partial cure and after holographic recording. These properties are desirable as they maximize data storage density of the holographic storage media.

The siloxane also has a high refractive index that is even higher than those of the polysiloxanes of the '069 patent, due to the presence of the R in the RMe$_2$SiO$_{1/2}$ at terminal ends of the siloxane in addition to the presence of R in the (MeRSiO$_{2/2}$)$_b$ of the siloxane, while maintaining the excellent compatibility and diffusion properties when mixed with polymerizable component. Higher refractive index of the siloxane also correlates to higher data storage capacity. Such a combination of high refractive index, excellent compatibility, and diffusion properties has not been achieved to date.

DETAILED DESCRIPTION OF THE PREFERRED EMBODIMENTS

The present invention provides a composition that includes a siloxane. The siloxane is useful as a component in the holographic storage media for photopolymer-based holographic data storage applications. More specifically, the siloxane is typically used as a binder, i.e., a non-polymerizable component, in the holographic storage media. Additionally, the composition may include a polymerizable component and a photoacid generator, in which case the composition itself may be useful as the holographic storage media.

The siloxane of the present invention is of the formula:

$$(RMe_2SiO_{1/2})_a(MeRSiO_{2/2})_b(RSiO_{3/2})_c(SiO_{4/2})_d$$

wherein a is at least 2, b is from 3 to 20, preferably from 3 to 8, c is from 0 to 10, preferably from 0 to 5, and d is from 0 to 10, preferably from 0 to 5. Each R is independently of the formula —CR'$_2$—CR'$_2$—Y—Z or —CR'$_2$—CR'$_2$—Z, wherein each R' is independently a hydrogen atom or a $C_1$ to $C_{10}$ hydrocarbyl free of aliphatic unsaturation so long as at least one R' is a hydrogen atom, Y is a divalent organic group, and Z is a polycyclic group containing at least one aromatic ring. In one embodiment of the subject invention, the polycyclic group Z contains at least two aromatic rings. In another embodiment of the subject invention, the polycyclic group Z contains at least three aromatic rings. It is to be appreciated that the siloxane can contain residual silicon bonded hydrogen atoms.

The siloxane may be either linear or branched. The amount of RMe$_2$SiO$_{1/2}$ present in the siloxane is dependent on the number of branches of the siloxane. For example, when the siloxane is linear, a is equal to 2. When the siloxane is branched with d equal to 1 and c equal to 0, the siloxane has four branches and, thus, a is typically equal to 4.

Typically, the siloxane of the present invention is compatible with the polymerizable component in the holographic storage media. By compatible, it is meant that the siloxane and the polymerizable component are miscible in each other and form a clear solution. The compatibility is important is order to achieve low scattering of light prior to curing of the polymerizable component. The clear solutions exhibit lower scattering of light than incompatible solutions, which have a hazy appearance. Furthermore, compatibility between the siloxane and the polymerizable component is important to create a homogenous solution that exhibits uniform curing of the polymerizable component. Weight average molecular weight ($M_w$) of the siloxane plays a role in the compatibility between the siloxane and the polymerizable component, with higher molecular weights of the siloxane less likely to be compatible with the polymerizable component.

Typically, the siloxane has a $M_w$ of less than or equal to 1500 g/mol. More specifically, the siloxane typically has a $M_w$ of from 700 to 1500 g/mol, more typically from 1000 to 1250 g/mol. The $M_w$ of the siloxane is determined by gel permeation chromatography (GPC) using a PLgel (Polymer Laboratories, Inc.) 5-μm column at room temperature (~23° C.), a THF mobile phase at 1 mL/min, and a refractive index detector, and polystyrene standards are used for linear regression calibrations.

The $M_w$ in the above ranges contributes to appearance of the composition after curing of the polymerizable component, as shown in the Examples below. For example, the appearance of the composition with the siloxane having the $M_w$ in the above ranges is visually transparent or clear after curing.

As indicated above, each R is independently of the formula —CR'$_2$—CR'$_2$—Y—Z or —CR'$_2$—CR'$_2$—Z, wherein each R' is independently a hydrogen atom or a $C_1$ to $C_{10}$ hydrocarbyl free of aliphatic unsaturation so long as at least one R' is a hydrogen atom, Y is a divalent organic group, and Z is a polycyclic group containing at least one aromatic ring.

The hydrocarbyl groups represented by R' are free of aliphatic unsaturation and typically have from 1 to 10 carbon atoms, alternatively from 1 to 6 carbon atoms. Acyclic hydrocarbyl groups containing at least 3 carbon atoms can have a branched or unbranched structure. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, decyl, undecyl, dodecyl, tridecyl, tetradecyl, pentadecyl, hexadecyl, heptadecyl, and octadecyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl.

The divalent organic groups represented by Y typically have from 1 to 10 carbon atoms, alternatively from 1 to 6 carbon atoms, and further from 1 to 4 carbon atoms. In addition to carbon and hydrogen, the divalent organic groups may contain other atoms such as nitrogen, oxygen, and halogen, provided the divalent group does not inhibit the hydrosilylation reaction, described below, used to prepare the polysiloxane or react with the hydrolysable group Z in the polysiloxane. Examples of divalent organic groups represented by Y include, but are not limited to, methylene, ethylene, propane-1,3-diyl, 2-methylpropane-1,3-diyl, butane-1,4-diyl, butane-1,3-diyl, pentane-1,5-diyl, pentane-1,4-diyl, hexane-1,6-diyl, octane-1,8-diyl, decane-1,10-diyl, cyclohexane-1,4-diyl, and phenyl ene.

The aromatic ring or rings of the polycyclic group Z substantially increase the refractive index of the siloxane. Z is preferably selected from the group of naphthyl groups, indenyl groups, anthryl groups, phenanthryl groups, pyrenyl groups, pentacenyl groups, tetrahydrochrysenyl groups, perylenyl groups, and combinations thereof in order to achieve the high refractive index of the siloxane. Typically, Z is a naphthyl group. The high refractive index of the siloxane of the present invention is further defined as at least 1.540, more typically at least 1.570, and most typically at least 1.590. In one embodiment of the subject invention, the refractive index of the siloxane is from 1.540 to 2.5. In another embodiment of the subject invention, the refractive index of the siloxane is from 1.570 to 2.5. In yet another embodiment of the subject invention, the refractive index of the siloxane is from 1.590 to 2.5.

The $(RMe_2SiO_{1/2})_a(MeRSiO_{2/2})_b(RSiO_{3/2})_c(SiO_{4/2})_d$ is formed through a hydrosilylation reaction, in the presence of a hydrosilylation catalyst, of an alkene of the formula $CR'_2=CR'-Y-Z$ or $CR'_2=CR'-Z$ and an organohydrogensiloxane of the formula $(HMe_2SiO_{1/2})_a(MeHSiO_{2/2})_b$ $(HSiO_{3/2})_c(SiO_{4/2})_d$, and optionally in the presence of an organic solvent. It is to be understood that the double bond of the alkene may be internal or terminal.

The method of the subject invention may include the step of forming the organohydrogensiloxane. The organohydrogensiloxane may be formed through reaction of $(HMeSi)_2O$, cyclic $(HMeSiO_{2/2})_4$, $HSiCl_3$, $HSi(OEt)_3$, $SiCl_4$, $Si(OEt)_4$, and water, in the presence of an acid catalyst. The acid catalyst may be selected from the group of hydrochloric acid, sulfonic acid, benzylsulfonic acid, trifluoroacetic acid, trifluoromethyl sulfonic acid, and combinations thereof. To form the organohydrogensiloxane, $(HMeSi)_2O$, cyclic $(HSiMeO_{2/2})_4$, and other necessary ingredients are mixed with the acid catalyst and heated to form equilibrated $(HMe_2SiO_{1/2})_a$ $(MeHSiO_{2/2})_b(HSiO_{3/2})_c(SiO_{4/2})_d$. The material can be distilled to remove the low and high molecular weight fraction if necessary.

To form the $(RMe_2SiO_{1/2})_a(MeRSiO_{2/2})_b(RSiO_{3/2})_c(SiO_{4/2})_d$, the $(HMe_2SiO_{1/2})_a(MeHSiO_{2/2})_b(HSiO_{3/2})_c(SiO_{4/2})_d$, the hydrosilylation catalyst, and the alkene of the formula $CR'_2=CR'-Y-Z$ or $CR'_2=CR'-Z$ are typically charged into a reactor along with a first charge of a solvent, such as HPLC grade toluene.

The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Examples of hydrosilylation catalysts include the complexes of chloroplatinic acid and certain vinyl-containing organosiloxanes disclosed by Willing in U.S. Pat. No. 3,419,593, which is hereby incorporated by reference. A specific example of such a catalyst is the reaction product of chloroplatinic acid and 1,3-diethenyl-1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s). Microencapsulated hydrosilylation catalysts and methods of preparing them are well known in the art, as exemplified in U.S. Pat. No. 4,766,176 and the references cited therein; and in U.S. Pat. No. 5,017,654.

The hydrosilylation catalyst can be a single hydrosilylation catalyst or a mixture comprising two or more different catalysts that differ in at least one property, such as structure, form, platinum group metal, complexing ligand, and thermoplastic resin.

The concentration of the hydrosilylation catalyst is sufficient to catalyze the addition reaction of the alkene with the organohydrogensiloxane. For example, the concentration of the hydrosilylation catalyst is typically sufficient to provide from 0.1 to 1000 ppm of a platinum group metal, alternatively from 1 to 500 ppm of a platinum group metal, or further alternatively from 5 to 150 ppm of a platinum group metal, based on the combined weight of the alkene and organohydrogensiloxane. The rate of cure is very slow below 0.1 ppm of platinum group metal. The use of more than 1000 ppm of platinum group metal results in no appreciable increase in cure rate, and is therefore uneconomical.

As indicated above, the hydrosilylation catalyst is preferably a platinum catalyst. When the hydrosilylation catalyst is a platinum catalyst, the platinum catalyst may be further defined as a Karstedt catalyst. A specific example of a Karstedt catalyst that is suitable for purposes of the present invention is a platinum vinyl siloxane complex.

Typically, the $(HMe_2SiO_{1/2})_a(MeHSiO_{2/2})_b(HSiO_{3/2})_c$ $(SiO_{4/2})_d$ and hydrosilylation catalyst are charged into the reactor prior to charging the alkene into the reactor. Preferably, the platinum catalyst is charged into the reactor in an amount sufficient to provide platinum in an amount of at least 5 ppm.

The $(HMe_2SiO_{1/2})_a(MeHSiO_{2/2})_b(HSiO_{3/2})_c(SiO_{4/2})_d$ and hydrosilylation catalyst are heated in the reactor to a temperature of about 70° C. prior to charging the alkene into the reactor. Upon reaching the desired temperature of the $(HMe_2SiO_{1/2})_a(MeHSiO_{2/2})_b(HSiO_{3/2})_c(SiO_{4/2})_d$ and hydrosilylation catalyst, the alkene is typically charged into the reactor over a period of at least 6 minutes. A reaction temperature is increased to about 75° C. due to an exothermic nature of the reaction.

An amount of unreacted SiH groups present in the reactor is analyzed, typically by using IR spectroscopy. When the particular hydrosilylation catalyst is a platinum catalyst, the platinum present in the reactor may be increased to at least 8 ppm. Additional alkene may be charged into the reactor to consume the unreacted SiH groups and the amount of unreacted SiH groups present in the reactor may again be analyzed until the IR spectroscopy shows that substantially no SiH groups remain in the reactor. The absence of SiH groups in the reactor indicates complete formation of the $(RMe_2SiO_{1/2})_a$ $(MeRSiO_{2/2})_b(RSiO_{3/2})_c(SiO_{4/2})_d$ from the $(HMe_2SiO_{1/2})_a$ $(MeHSiO_{2/2})_b(HSiO_{3/2})_c(SiO_{4/2})_d$.

Excess alkene may then be removed from the reactor. More specifically, a first charge of silica gel may be added to the reactor and mixed with the $(RMe_2SiO_{1/2})_a(MeRSiO_{2/2})_b$ $(RSiO_{3/2})_c(SiO_{4/2})_d$ and excess alkene, among any other residual components in the reactor. The first charge of silica gel may then be filtered from the components in the reactor with a 0.45 micron membrane filter. Of course, it is understood by those skilled in the art that other size and type filters may be selected for use in the method of the present invention based on many factors including, but not limited to, pressure and type of silica gel (e.g. particle size).

The siloxane is then separated from the first charge of the solvent. More specifically, the solvent is separated from the siloxane under vacuum. Residual alkene is then separated from the siloxane at a temperature of about 100° C. with a continuous purge of nitrogen gas under reduced pressure of from about 2 to 5 mm Hg for a period of about 4 hours.

The resulting siloxane is then redissolved into a second charge of solvent. A second charge of silica gel is added to the siloxane and second charge of solvent. The silica gel, siloxane, and second charge of solvent are typically mixed for a period of about 16 hours. The second charge of silica gel is then filtered from the siloxane and second charge of solvent with the 0.45 micron membrane filter, and the second charge of solvent is separated from the siloxane.

After the aforementioned processing, i.e., purifying steps, the siloxane is typically at least 95 area percent pure based on gel permeation chromatography. More typically, the siloxane is about 98 area percent pure.

In one specific example, the siloxane is further defined as $(HMe_2SiO_{1/2})_2(MeHSiO_{2/2})_b$ and the step of charging the $(HMe_2SiO_{1/2})_a(MeHSiO_{2/2})_b(HSiO_{3/2})_c(SiO_{4/2})_d$ into the reactor is further defined as charging $(HMe_2SiO_{1/2})_2(MeHSiO_{2/2})_b$ into the reactor. The organohydrogensiloxane may be formed through reaction of $(HMeSi)_2O$ and cyclic $(HMeSiO_{2/2})_4$ in the presence of the acid catalyst. Typically, the $(HMeSi)_2O$ and cyclic $(HMeSiO_{2/2})_4$ are reacted at a mole ratio of from about 2:1 to about 1:10, more typically at a mole ratio of from about 1:1 to about 1:3.

As set forth above, the composition may further include a polymerizable component. More specifically, the composition may include at least one polymerizable component selected from the group of polymerizable monomers, polymerizable oligomers, and combinations thereof. For purposes of the present invention, the polymerizable component is typically selected from the group of epoxy monomers, epoxy oligomers, and combinations thereof since polymers formed from epoxies typically exhibit minimal shrinkage, which is desired for holographic data storage applications. In one example, the polymerizable component is further defined as an epoxy of the formula:

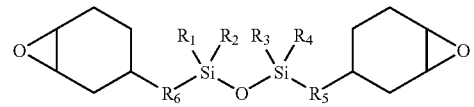

wherein $R_1$, $R_2$, $R_3$, and $R_4$ are selected from the group of $C_1$ to $C_{15}$ alkyl groups, $C_1$ to $C_{15}$ groups including at least one SiO portion and an epoxy end group, and combinations thereof, and $R_5$ and $R_6$ are selected from the group of $C_2$ to $C_{15}$ alkylene groups, $C_2$ to $C_{15}$ groups including at least one SiO portion, and combinations thereof. One specific example of the epoxy is further defined as a diepoxy of the formula:

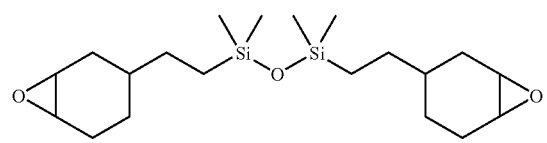

Another specific example of the epoxy is an epoxy tetramer, set forth in U.S. Pat. No. 6,784,300 (hereinafter the '300 patent), the disclosure of which is hereby incorporated by reference. The epoxy tetramer set forth in the '300 patent is of the formula:

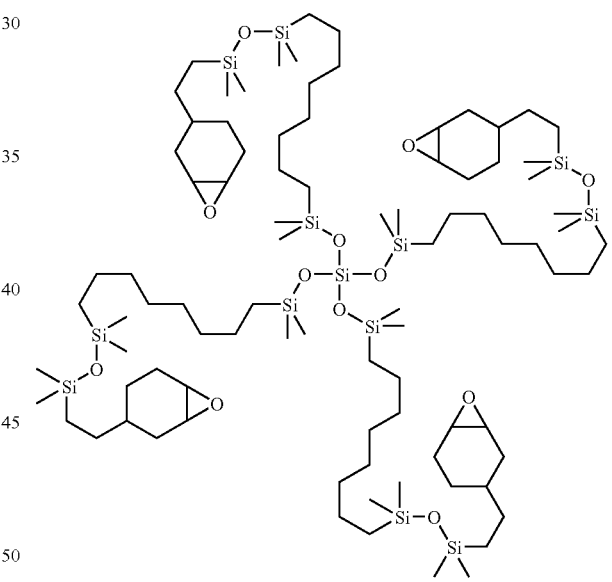

Although the above epoxies are suitable as the polymerizable component in the composition of the present invention, it is to be appreciated that other polymerizable components including other epoxies, as well as other non-epoxy polymerizable components, may also be suitable for purposes of the subject invention.

Also as set forth above, the composition may further include the photoacid generator. The photoacid generator induces cationic ring-opening polymerization when the polymerizable component is the epoxy. The photoacid generator functions by producing an acid upon exposure to actinic radiation. The term "acid generator" or PAG is used herein to refer to the component or components of the composition that are responsible for radiation-induced formation of acid. Thus, the photoacid generator may comprise only a single compound that produces acid directly. Alternatively, the photoacid generator may comprise an acid generating component which generates acid and one or more sensitizers which render the acid generating component sensitive to a particular wavelength of actinic radiation.

The acid produced from the photoacid generator may be either a Bronsted acid or Lewis acid, provided of course that the acid is of a type and strength which will induce cationic polymerization of the polymerizable monomer or oligomer. When the acid produces a Bronsted acid, this acid preferably has a $pK_a$ less than about 0. Known superacid precursors such as diazonium, sulfonium, phosphonium and iodonium salts may be included in the composition of the present invention, but iodonium salts are generally preferred. Diaryliodonium salts may also be suitable for the photoacid generator. Specific examples of diaryliodonium salts include (5-octyloxyphenyl)phenyliodonium hexafluoroantimonate and ditolyliodonium tetrakis(pentafluorophenyl)borate, diphenyliodonium tetrakis(pentafluorophenyl)borate, tolylphenyliodonium tetrakis(pentafluorophenyl)borate and cumyltolyliodonium tetrakis(pentafluorophenyl)borate.

When the composition of the present invention is used as the holographic storage medium itself, the polymerizable component is typically present in an amount of at least 50 parts by weight, more typically from 50 to 75 parts by weight, based on the total weight of the composition. The siloxane is typically present in an amount of at least 15 parts by weight, more typically from 20 to 40 parts by weight, based on the total weight of the composition. The photoacid generator is typically present in an amount of from 1 to 7 parts by weight based on the total weight of said composition.

To form the composition of the subject invention including the polymerizable component and the photoacid generator, the siloxane is prepared as described above. The siloxane, the polymerizable component, and the photoacid generator may be concurrently mixed in the above relative amounts. Alternatively, the siloxane, the polymerizable component, and the photoacid generator may be mixed sequentially in any order. For example, the photoacid generator and the siloxane may be mixed prior to mixing in the polymerizable component, the siloxane and the polymerizable component may be mixed prior to mixing in the photoacid generator, etc.

Example 1

Synthesis of $(HMe_2SiO_{1/2})_2(MeHSiO_{2/2})_b$ for Example 1

A three-liter, acid washed, oven dried three-neck flask is fitted with mechanical stirrer, condenser and addition funnel. After purging the flask with nitrogen, the flask is charged with 960.6 g of $(MeHSiO_{2/2})_4$, 3.3 g of trifluoromethyl sulfonic acid and 3.3 g distilled water. The flask is heated to 70° C. and a 536 g sample of $(HMe_2Si)_2O$ is added over a 75-minute period. The contents of the flask are heated at 70° C. for an additional two hours. After cooling to room temperature, a 21 g sample of $CaCO_3$ is added to the flask to neutralize the acid. The contents of the flask, which include $(HMe_2SiO_{1/2})_2(MeHSiO_{2/2})_b$, are filtered through a glass frit to give a crude product. The filtered material is charged to an acid-washed flask and heated at 50° C. and 6 mmHg vacuum for 90 minutes to distill off 338 g of volatile material. The pot temperature is then raised to 130° C. (6 mmHg vacuum) and heated for 30 minutes to distill off 421.7 g of $(HMe_2SiO_{1/2})_2(MeHSiO_{2/2})_b$. This material has a $M_w$ of 471 and a $M_n$ of 433 measured by GPC. The residual 704 g of material left in the flask is a high molecular weight material that is not further used.

Synthesis of $(RMe_2SiO_{1/2})_2(MeRSiO_{2/2})_b$ for Example 1

A 250 mL three-neck round bottom flask, equipped with an addition funnel, thermometer, condenser and a mechanical stirrer, is charged with 9.98 g of the $(HMe_2SiO_{1/2})_2(MeHSiO_{2/2})_b$, which is formed as described above and which has a $M_w$ of 471 and a $M_n$ 433, and 40 g of HPLC grade toluene under nitrogen. A sample of Karstedt catalyst is added to give a composition containing 7.3 ppm Pt. The reactor is stirred at 550 rpm and heated to 70° C. 29.58 g of 1-allyl naphthalene is added over eight minutes and the composition is heated at 70° C. for 5 hrs. An IR analysis of the composition shows incomplete conversion of the SiH. 4.5 g of 1-allyl naphthalene are added and the catalyst concentration is increased to 10.1 ppm. The composition is then heated at 100° C. for an additional 18 hours to complete the reaction. The solvent is removed using a rotary evaporator, followed by heating at 100° C. with a continuous purge of nitrogen under vacuum of from 2 to 5 mm Hg for 4 hours.

The composition is a translucent amber oil, which is dissolved into 40 g of a hexane solvent and mixed with 6.75 g of silica gel. The composition is stirred for 18 hours at room temperature and then filtered through a 0.2-micron membrane filter to yield a clear colorless solution. After solvent evaporation via a rotary evaporator, 31.4 g of the composition is obtained as a colorless, but translucent oil. The composition is then charged into a flask, attached to a vacuum line, and further dried at 0.5 mm Hg for 2 hours at room temperature. The final composition includes $(RMe_2SiO_{1/2})_2(MeRSiO_{2/2})_b$, wherein R is 3-naphthyl propyl, and has a $M_w$ of 1070 and a $M_n$ of 970 measured by GPC.

Example 2

Synthesis of $(HMe_2SiO_{1/2})_4MeHSiO_{2/2})_b$ for Example 2

A three-liter, acid washed, oven dried three-neck flask is fitted with mechanical stirrer, condenser and addition funnel. After purging the flask with nitrogen, the flask is charged with 960.6 g of $(MeHSiO_{2/2})_4$, 3.3 g of trifluoromethyl sulfonic acid and 3.3 g distilled water. The flask is heated to 70° C. and a 536 g sample of $(HMe_2Si)_2O$ is added over a 75-minute period. The contents of the flask are heated at 70° C. for an additional two hours. After cooling to room temperature, a 21 g sample of $CaCO_3$ is added to the flask to neutralize the acid. The contents of the flask, which include $(HMe_2SiO_{1/2})_2(MeHSiO_{2/2})_b$, are filtered through a glass frit to give a crude product. The filtered material is charged to an acid-washed flask and heated at 50° C. and 6 mmHg vacuum for 90 minutes to distill off 338 g of volatile material. The pot temperature is then raised to 130° C. (6 mmHg vacuum) and heated for 30 minutes to distill off 421.7 g of $(HMe_2SiO_{1/2})_2(MeHSiO_{2/2})_b$. This material has a $M_w$ of 594 and a $M_n$ of 543 measured by GPC. The residual 704 g of material left in the flask is a high molecular weight material that is not further used in the Example.

Synthesis of $(RMe_2SiO_{1/2})_2(MeRSiO_{2/2})_b$ for Example 2

A 250 mL three-neck round bottom flask, equipped with an addition funnel, thermometer, condenser and a mechanical stirrer, is charged with 10.16 g of $(HMe_2SiO_{1/2})_2(MeSiO_{2/2})_b$, which is formed through the method as described above and which has a $M_w$ of 594 and a $M_n$ 543, and 34.6 g of HPLC grade toluene under nitrogen. A sample of Karstedt catalyst is added to give a composition containing 5.4 ppm Pt. The reactor is stirred at 550 rpm and heated to 70° C. 24.7 g of 1-allyl naphthalene is dripped in over seven minutes. After an exotherm that raises the reaction temperature to 79° C., the composition is held at 70° C. and progress is periodically checked by IR analysis. After 8 hours, an additional 9.9 g of 1-allyl naphthalene are added to give 34.55 g of total 1-allyl naphthalene, and the catalyst concentration is increased to 12.4 ppm. The reaction mixture is then heated at 100° C. for two hours. IR analysis still shows a trace amount of residual SiH. The solvent is removed using a rotary evaporator. The residual composition is then charged into a flask and attached to a vacuum line and heated at 100° C. with a continuous purge of nitrogen under reduced pressure of from 2 to 5 mm Hg for 4 hours to remove excess 1-allyl naphthalene.

The composition is dissolved into 41.9 g of a hexane solvent and 6.5 g of silica gel is added. The composition is stirred for 16 hours at room temperature before filtering the composition through a 0.45-micron membrane filter, which yields a clear colorless solution. The solvent is removed using a roto-vap to yield an opaque/colorless oil. The composition is again dissolved in 38 g of the hexane solvent and combined with 5.9 g of silica gel. The composition is stirred for 16 hours and filtered through a 0.2-micron membrane filter. The hexane solvent is removed using a roto-vap. The composition is further dried under vacuum of about 0.5 mm Hg at room temperature using a vacuum line for 4 hours to remove the residual hexane solvent. 25.9 g of the final composition is obtained. The appearance of the composition does not improve and remains lightly opaque, but colorless. IR analysis shows an absence of SiH in the final composition, which includes $(RMe_2SiO_{1/2})_2(MeRSiO_{2/2})_b$, wherein R is 3-naphthyl propyl. The final composition has a $M_w$ of 1200 and a $M_n$ of 1100 measured by GPC.

Example 3

Synthesis of $(HMe_2SiO_{1/2})_a(MeHSiO_{2/2})_b(SiO_{3/2})_c(SiO_{4/2})_d$ for Example 3

A 250 mL three-neck round bottom flask, equipped with an addition funnel, thermometer, condenser and a mechanical stirrer, is charged with 430 g of $(MeHSiO_{2/2})_4$, 1.5 g of trifluoromethyl sulfonic acid, and 5 g of distilled water. A mixture including 250 g of $(HMeSi)_2O$, 5 g of $HSi(OEt)_3$, and 5 g of $Si(OEt)_4$ is charged into the flask. The contents of the flask are heated at about 70° C. for about two hours. After cooling to room temperature, 15 g of $CaCO_3$ are added to neutralize the acid. The mixture is filtered through a glass frit to give a crude product. Product with desired molecular weigh can be obtained by distillation. After cooling to room temperature, 15 g of $CaCO_3$ is added to neutralize the acid. The contents of the flask, which include $(HMe_2SiO_{1/2})_a(MeHSiO_{2/2})_b(HSiO_{3/2})_c(SiO_{4/2})_d$, are filtered through a glass frit to give a crude product. The filtered material is charged to an acid-washed flask and heated at 50° C. and 6 mmHg vacuum for 90 minutes to distill off volatile material. The pot temperature is then raised to 130° C. (6 mmHg vacuum) and heated for 30 minutes to distill off $(HMe_2SiO_{1/2})_a(MeHSiO_{2/2})_b(HSiO_{3/2})_c(SiO_{4/2})_d$. The residual material left in the flask is a high molecular weight material that is not further used.

Synthesis of $(RMe_2SiO_{1/2})_a(MeRSiO_{2/2})_b(RSiO_{3/2})_c(SiO_{4/2})_d$ for Example 3

1-allyl naphthalene is reacted with the $(HMe_2SiO_{1/2})_a(MeHSiO_{2/2})_b(HSiO_{3/2})_c(SiO_{4/2})_d$ in the same manner as described above in Examples 1 and 2 in which $(HMe_2SiO_{1/2})_2(MeHSiO_{2/2})_b$ is used. The final composition is also prepared in the same manner as described above for Examples 1 and 2. The final composition will include $(RMe_2SiO_{1/2})_a(MeRSiO_{2/2})_b(RSiO_{3/2})_c(SiO_{4/2})_d$, wherein R is 3-naphthyl propyl.

Example 4

Synthesis of $(HMe_2SiO_{1/2})_a(MeHSiO_{2/2})_b(HSiO_{3/2})_c$ for Example 4

A 250 mL three-neck round bottom flask, equipped with an addition funnel, thermometer, condenser and a mechanical stirrer, is charged with 430 g of $(MeHSiO_{2/2})_4$, 1.5 g of trifluoromethyl sulfonic acid, and 3.3 g of distilled water. A mixture including 250 g of $(HMeSi)_2O$ and 5 g of $HSi(OEt)_3$ is charged into the flask. The contents of the flask are heated at about 70° C. for about two hours. After cooling to room temperature, 15 g of $CaCO_3$ are added to neutralize the acid. The mixture is filtered through a glass flit to give a crude product. Product with desired molecular weigh can be obtained by distillation. After cooling to room temperature, 15 g of $CaCO_3$ is added to neutralize the acid. The contents of the flask, which include $(HMe_2SiO_{1/2})_a(MeHSiO_{2/2})_b(HSiO_{3/2})_c$, are filtered through a glass frit to give a crude product. The filtered material is charged to an acid-washed flask and heated at 50° C. and 6 mmHg vacuum for 90 minutes to distill off volatile material. The pot temperature is then raised to 130° C. (6 mmHg vacuum) and heated for 30 minutes to distill off $(HMe_2SiO_{1/2})_a(MeHSiO_{2/2})_b(HSiO_{3/2})_c$. The residual material left in the flask is a high molecular weight material that is not further used.

Synthesis of $(RMe_2SiO_{1/2})_a(MeRSiO_{2/2})_b(RSiO_{3/2})_c$ for Example 4

1-allyl naphthalene is reacted with the $(HMe_2SiO_{1/2})_a(MeHSiO_{2/2})_b(HSiO_{3/2})_c$ in the same manner as described above in Examples 1 and 2 in which $(HMe_2SiO_{1/2})_2(MeHSiO_{2/2})_b$ is used. The final composition is also prepared in the same manner as described above for Examples 1 and 2. The final composition will include $(RMe_2SiO_{1/2})_a(MeRSiO_{2/2})_b(RSiO_{3/2})_c$, wherein R is 3-naphthyl propyl.

Example 5

Synthesis of $(HMe_2SiO_{1/2})_a(MeHSiO_{2/2})_b(SiO_{4/2})_d$ for Example 5

A 250 mL three-neck round bottom flask, equipped with an addition funnel, thermometer, condenser and a mechanical stirrer, is charged with 430 g of $(MeHSiO_{2/2})_4$, 1.5 g of trifluoromethyl sulfonic acid, and 5 g of distilled water. A mixture including 250 g of $(HMeSi)_2O$ and 5 g of $Si(OEt)_4$ is charged into the flask. The contents of the flask are heated at about 70° C. for about two hours. After cooling to room temperature, 15 g of $CaCO_3$ are added to neutralize the acid. The mixture is filtered through a glass frit to give a crude product. Product with desired molecular weigh can be obtained by distillation. After cooling to room temperature, 15 g of $CaCO_3$ is added to neutralize the acid. The contents of the flask, which include $(HMe_2SiO_{1/2})_a(MeHSiO_{2/2})_b(SiO_{4/2})_d$, are filtered through a glass frit to give a crude product.

The filtered material is charged to an acid-washed flask and heated at 50° C. and 6 mmHg vacuum for 90 minutes to distill off volatile material. The pot temperature is then raised to 130° C. (6 mmHg vacuum) and heated for 30 minutes to distill off $(HMe_2SiO_{1/2})_a(MeHSiO_{2/2})_b(SiO_{4/2})_d$. The residual material left in the flask is a high molecular weight material that is not further used.

Synthesis of $(RMe_2SiO_{1/2})_a(MeRSiO_{2/2})_b(SiO_{4/2})_d$ for Example 5

1-allyl naphthalene is reacted with the $(HMe_2SiO_{1/2})_a(MeHSiO_{2/2})_b(SiO_{4/2})_d$ in the same manner as described above in Examples 1 and 2 in which $(HMe_2SiO_{1/2})_2(MeHSiO_{2/2})_b$ is used. The final composition is also prepared in the same manner as described above for Examples 1 and 2. The final composition will include $(RMe_2SiO_{1/2})_a(MeRSiO_{2/2})_b(SiO_{4/2})_d$, wherein R is 3-naphthyl propyl.

Comparative Example 1

A 250 mL three-neck round bottom flask, equipped with an addition funnel, thermometer, condenser and a mechanical stirrer, is charged with 10.02 g of $Me_2HSiO(MeHSiO_{2/2})_b SiMe_2H$, having a $M_w$ of 839 and a $M_n$ of 676, and 33.2 g of HPLC grade toluene under nitrogen. A sample of Karstedt catalyst is added to give a composition including 5.9 ppm Pt. The composition in the reactor is stirred at 550 rpm and heated to 70° C. 22.7 g of 1-allyl naphthalene is dripped in to the flask over six minutes. A reaction temperature increases to 75° C. due to the exothermic nature of the reaction. After 1 hour at 70° C., IR analysis shows residual, unreacted SiH groups. 3.4 g of 1-allyl naphthalene are charged into the flask and the composition is held at temperature for an additional 2.5 hours. IR analysis of the composition still shows the reaction to be incomplete. An additional 3.3 g of 1-allyl naphthalene is added and the composition is held at 70° C. for 3 hours before the platinum concentration is increased to 8.4 ppm. 9 hours after the platinum addition, an additional 3.4 g of 1-allyl naphthalene is added (32.73 g total 1-allyl naphthalene). The composition is held at temperature until the reaction is complete, as indicated by disappearance of SiH stretching in the IR analysis. In total, the reaction requires a total of 26 hours at 70° C.

The composition is cooled to room temperature before 6.1 g of silica gel is added. The composition is stirred for 73 hours and then filtered through a 0.45 micron membrane filter to remove the silica gel. The solvent is removed under vacuum and the residual composition is further heated at 100° C. with a continuous purge of nitrogen under reduced pressure of from 2-5 mm Hg for 4 hours to remove excess 1-allyl naphthalene.

The resulting composition is a translucent amber oil, which is redissolved into 41 g of HPLC toluene and treated with 6.8 g of silica gel for 16 hours before it is filtered through a 0.45-micron membrane filter. The composition is dried on a rotary evaporator to yield 22.1 g of the composition. The flask containing the composition is attached to a vacuum line and the composition is further dried under a vacuum of about 0.5 mm Hg at room temperature for 4 hours to remove excess toluene. The composition is dissolved into 40 g of a hexane solvent and mixed with 6.75 g of silica gel. The composition is stirred for 18 hours at room temperature and then filtered through a 0.2-micron membrane filter to yield a clear colorless solution. After solvent evaporation via a rotary evaporator, the composition is obtained as 31.4 g of a colorless, translucent oil. The composition is then charged into a flask and attached to a vacuum line and further dried at 0.5 mm Hg for 2 hour at room temperature. The composition has a $M_w$ of 1810 and a $M_n$ of 1410 measured by GPC.

Results

The refractive index of the compositions of Examples 1-3 is shown in Table 1, as determined using an Abe Refractometer at 589.3 nm and at 24° C. $M_w$ is also included in Table 1 and, as alluded to above, was determined by gel permeation chromatography (GPC). More specifically, the determination of $M_w$ by GPC used a PLgel (Polymer Laboratories, Inc.) 5-μm column at room temperature (~23° C.), a THF mobile phase at 1 mL/min, and a refractive index detector. Polystyrene standards were used for linear regression calibrations. This method for determining $M_w$ was used throughout the Examples. As is apparent from Table 1, the refractive index increases slightly with increasing $M_w$ of the $(Me_2RSiO_{1/2})_2 (MeRSiO_{2/2})_b$ in the final compositions.

TABLE 1

| Composition | $M_w$ | Refractive Index at 25° C. |
|---|---|---|
| Example 1 | 1,070 | 1.5939 |
| Example 2 | 1,200 | 1.5949 |
| Comparative Example 1 | 1,810 | 1.5973 |

Although refractive indexes are not known for Examples 3-5, the refractive indexes would be expected to be similar to those of Examples 1 and 2.

A binder screening scatter test is implemented by preparing a test coupon from two standard microscope slides, a U shaped paper shim (cut from a file folder), and two standard jaw type paper clamps. The slides are staggered to create a 3 mm capillary fill lip. 1 to 2 grams of a holographic storage media are prepared with a formulation of 30.6 parts by weight of one of the compositions from the above Examples, 26.3 parts by weight of a diepoxy of the following formula:

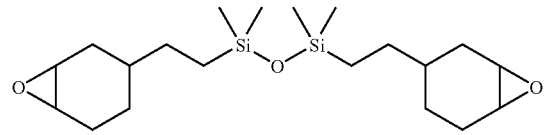

37.1 parts by weight of an epoxy tetramer of the following formula:

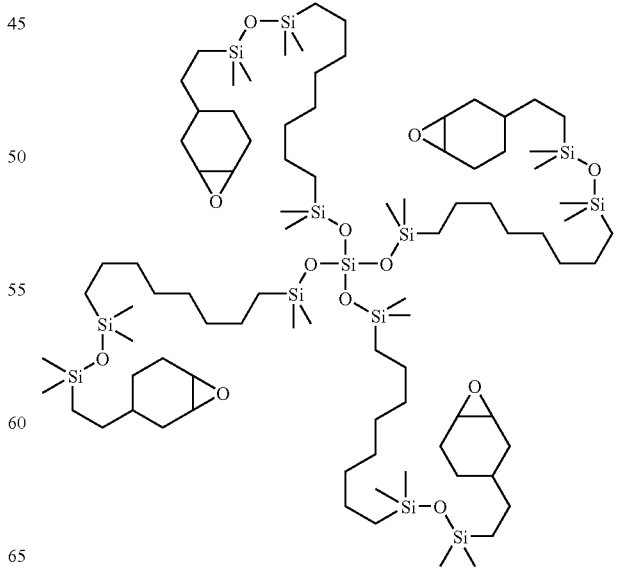

and 6.0 parts by weight of Rhodorsil Phodorsil® photoacid generator commercially available from Rhodia Silicones. The holographic storage media is syringe filtered (0.2 micron) and used to fill the test coupon. The holographic storage media is cured by passing through a convey type UV curing apparatus 3 times. The UV intensity for each pass is 153 mJ/cm. Scatter results for the compositions of Examples 1-3, along with a control, are shown in Table 2. The holographic storage media including the composition of Example 2, which is produced from a lower molecular weight linear siloxane than Comparative Example, gives no haze at all while holographic storage media including the composition of Comparative Example 1, which is produced from the highest molecular weight linear siloxane of the three examples, yields some degree of haze, as determined through visual observation. The results confirm that molecular weight of the siloxane plays a role in light scattering properties of the holographic storage medium.

TABLE 2

| Composition | Appearance Before Cure | Appearance After Cure |
|---|---|---|
| Control | Clear | Clear |
| Example 2 | Clear | Clear |
| Comparative Example 1 | Clear | Hazy |

Although appearance data is unavailable for Examples 1 and 3-5, the appearance of those examples would be expected to be similar to the appearance, both before and after cure, of Example 2.

The invention has been described in an illustrative manner, and it is to be appreciated that the terminology which has been used is intended to be in the nature of words of description rather than of limitation. Obviously, many modifications and variations of the present invention are possible in view of the above teachings. It is, therefore, to be appreciated that within the scope of the claims the invention may be practiced otherwise than as specifically described.

What is claimed is:

1. A composition comprising:
a siloxane of the formula:

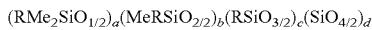

wherein a is at least 2, b is from 3 to 20, c is from 0 to 10, d is from 0 to 10, and each R is independently of the formula —CR'$_2$—CR'$_2$—Y—Z or —CR'$_2$—CR'$_2$—Z, wherein each R' is independently a hydrogen atom or a $C_1$ to $C_{10}$ hydrocarbyl free of aliphatic unsaturation so long as at least one R' is a hydrogen atom, Y is a divalent organic group, and Z is selected from the group of naphthyl groups, indenyl groups, anthryl groups, phenanthryl groups, pyrenyl groups, pentacenyl groups, tetrahydrochrysenyl groups, perylenyl groups, and combinations thereof.

2. A composition as set forth in claim 1 wherein b is from 3 to 8.

3. A composition as set forth in claim 1 having a refractive index of at least 1.540.

4. A composition as set forth in claim 1 wherein said siloxane has a weight average molecular weight ($M_w$) of less than or equal to 1500 g/mol.

5. A composition as set forth in claim 1 wherein said siloxane is formed through a hydrosilylation reaction of an alkene of the formula CR'$_2$=CR'—Y—Z or CR'$_2$=CR'—Z and an organohydrogensiloxane of the formula:

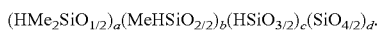

6. A composition as set forth in claim 1 wherein said siloxane is of the formula:

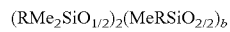

wherein b is from 3 to 8.

7. A composition as set forth in claim 6 wherein said siloxane is formed through a hydrosilylation reaction of an alkene of the formula CR'$_2$=CR'—Y—Z or CR'$_2$=CR'—Z and an organohydrogensiloxane of the formula:

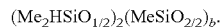

8. A composition as set forth in claim 1 further comprising at least one polymerizable component selected from the group of polymerizable monomers, polymerizable oligomers, and combinations thereof.

9. A composition as set forth in claim 8 wherein said polymerizable component is selected from the group of epoxy monomers, epoxy oligomers, and combinations thereof.

10. A composition as set forth in claim 8 wherein said polymerizable component is further defined as an epoxy of the formula:

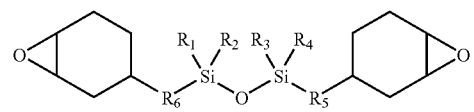

wherein $R_1$, $R_2$, $R_3$, and $R_4$ are selected from the group of $C_1$ to $C_{15}$ alkyl groups, $C_1$ to $C_{15}$ groups including at least one SiO portion and an epoxy end group, and combinations thereof, and $R_5$ and $R_6$ are selected from the group of $C_2$ to $C_{15}$ alkylene groups, $C_2$ to $C_{15}$ groups including at least one SiO portion, and combinations thereof.

11. A holographic storage medium formed from said composition as set forth in claim 1.

12. A method of forming a composition comprising the steps of:
charging (HMe$_2$SiO$_{1/2}$)$_a$(MeHSiO$_{2/2}$)$_b$(HSiO$_{3/2}$)$_c$(SiO$_{4/2}$)$_d$ into a reactor, wherein a is at least 2, b is from 3 to 20, c is from 0 to 10, and d is from 0 to 10;
charging a hydrosilylation catalyst into the reactor; and
charging an alkene of the formula CR'$_2$=CR'—Y—Z or CR'$_2$=CR'—Z into the reactor, wherein each R' is independently a hydrogen atom or a $C_1$ to $C_{10}$ hydrocarbyl free of aliphatic unsaturation so long as at least one R' is a hydrogen atom, Y is a divalent organic group, and Z is selected from the group of naphthyl groups, indenyl groups, anthryl groups, phenanthryl groups, pyrenyl groups, pentacenyl groups, tetrahydrochrysenyl groups, perylenyl groups, and combinations thereof, to form a siloxane of the formula:

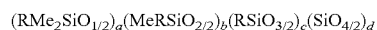

wherein each R is independently of the formula —CR'$_2$—CR'$_2$—Y—Z or —CR'$_2$—CR'$_2$—Z, and R', Y, and Z are as defined above.

13. A method as set forth in claim 12 wherein b is from 3 to 8.

14. A method as set forth in claim 12 wherein the step of charging (HMe$_2$SiO$_{1/2}$)$_a$(MeHSiO$_{2/2}$)$_b$(HSiO$_{3/2}$)$_c$(SiO$_{4/2}$)$_d$ into the reactor is further defined as charging (HMe$_2$SiO$_{1/2}$)$_2$(MeHSiO$_{2/2}$)$_b$ into the reactor.

15. A method as set forth in claim 12 wherein the hydrosilylation catalyst is further defined as a platinum catalyst and the platinum catalyst is charged in an amount sufficient to provide platinum in an amount of at least 5 ppm.

16. A method as set forth in claim 12 further comprising the step of increasing an amount of the platinum present in the reactor to at least 8 ppm.

17. A method as set forth in claim 12 further comprising the steps of analyzing an amount of unreacted SiH groups present in the reactor and charging additional alkene into the reactor to consume the unreacted SiH groups.

18. A method as set forth in claim 12 further comprising the step of processing the siloxane until the siloxane is at least 95 area percent pure.

19. A method as set forth in claim 12 further comprising the step of mixing the siloxane and at least one polymerizable component selected from the group of polymerizable monomers, polymerizable oligomers, and combinations thereof.

20. A method as set forth in claim 19 wherein the polymerizable component is selected from the group of epoxy monomers, epoxy oligomers, and combinations thereof.

21. A method as set forth in claim 20 wherein the polymerizable component is further defined as an epoxy of the formula:

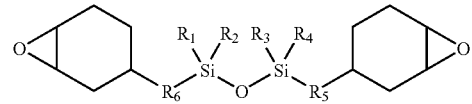

wherein $R_1$, $R_2$, $R_3$, and $R_4$ are selected from the group of $C_1$ to $C_{15}$ alkyl groups, $C_1$ to $C_{15}$ groups including at least one SiO portion and an epoxy end group, and combinations thereof, and $R_5$ and $R_6$ are selected from the group of $C_2$ to $C_{15}$ alkylene groups, $C_2$ to $C_{15}$ groups including at least one SiO portion, and combinations thereof.

22. A method as set forth in claim 19 further comprising the step of mixing a photoacid generator and the siloxane.

* * * * *